US005646609A

United States Patent [19]

O'Brien

[11] Patent Number: 5,646,609

[45] Date of Patent: Jul. 8, 1997

[54] CIRCUIT AND METHOD FOR SELECTING A CIRCUIT MODULE

[75] Inventor: Gary J. O'Brien, Pheonix, Ariz.

[73] Assignee: Motorola, Inc., Schaumburg, Ill.

[21] Appl. No.: 367,601

[22] Filed: Jan. 3, 1995

[51] Int. Cl.[6] .......... H04Q 1/00

[52] U.S. Cl. .......... 340/825.78; 340/825.77; 340/825.52

[58] Field of Search .......... 340/825.78, 825.77, 340/825.07, 825.08, 825.5, 825.52, 825.54; 355/207; 327/50, 57, 76, 77; 395/200.16; 370/116

[56] References Cited

U.S. PATENT DOCUMENTS

| | | | |
|---|---|---|---|
| 4,327,993 | 5/1982 | Gauronski et al. | 355/207 |
| 4,423,414 | 12/1983 | Bryant et al. | 340/825.07 |
| 4,430,576 | 2/1984 | Fowler | 340/825.77 |
| 4,510,493 | 4/1985 | Bux et al. | 340/825.52 |
| 4,604,620 | 8/1986 | Oho et al. | 340/825.52 |
| 4,658,249 | 4/1987 | Vogt | 340/825.08 |
| 4,700,174 | 10/1987 | Sutherland et al. . | |
| 4,746,879 | 5/1988 | Ma et al. . | |
| 4,947,162 | 8/1990 | Kimura | 340/825.08 |
| 5,146,172 | 9/1992 | Mehr-Ayin et al. | 340/825.78 |

*Primary Examiner*—Edwin C. Holloway, III
*Attorney, Agent, or Firm*—Rennie William Dover

[57] ABSTRACT

A circuit (20) and a method for selecting a circuit module ($M_N$) from a plurality of circuit modules ($M_0$–$M_N$) coupled to a common bus (23). The circuit (20) includes a plurality of resistor divider networks ($RD_0$–$RD_N$), wherein a single resistor divider network is coupled to a corresponding circuit module. Each resistor divider network ($RD_0$–$RD_N$) provides the corresponding circuit module with an analog voltage upon initialization of the circuit (20). The analog voltage is converted into a digital voltage and serves as a unique address for the corresponding circuit module ($M_0$–$M_N$). An analog electrical signal on the common bus (23) is converted into a digital electrical signal which is compared with the addresses of the plurality of circuit modules ($M_0$–$M_N$). The circuit module having an address that matches the digital electrical signals is selected for receiving data or control signals from external circuitry.

15 Claims, 5 Drawing Sheets

CIRCUIT AND METHOD FOR SELECTING A CIRCUIT MODULE

BACKGROUND OF THE INVENTION

The present invention relates, in general, to network modules and, more particularly, to selecting or accessing network modules connected to a common communication bus.

One type of network module widely used in applications such as automotive, building ventilation, and general industrial applications is a sensor module. Sensor modules sense a physical condition such as pressure, temperature, or acceleration and provide an analog electrical signal representative of the sensed physical condition. The sensor's analog electrical output signal is then converted to a digital electrical output signal via an analog-to-digital (A/D) converter present in the sensor module. Typically, sensor modules include a microprocessor unit (MPU) or a microcontroller unit (MCU) that has A/D conversion capability. The digital electrical output signal is then routed directly to another MPU or MCU (which serves as a master, slave, or peer) or the networked sensor module enters an idle mode until a request for information is received.

A drawback of conventional networked sensor modules is that for a number of "N" networked modules, "N" extra conductors (wires) are needed in addition to the common bus to uniquely address each module. More particularly, the cost of conductors represents a significant portion of the total system cost for systems having more than a few network modules. In addition, the number of I/O pins on an MCU/MPU limits the number of conductors that may be coupled between the MCU/MPU and the common bus.

Accordingly, it would be advantageous to have a method and a means for increasing the number of network modules coupled to a bus from 1 to "N," and that permits addressing each network module without increasing the number of conductors for addressing each module.

DETAILED DESCRIPTION OF THE DRAWINGS

Generally, the present invention provides circuitry and a method for selecting or accessing at least one circuit module from a plurality of circuit modules coupled to a common bus. It should be noted that circuit modules are also referred to as network modules or networked circuit modules. It should be further noted that a networked circuit module refers to an array of circuit modules connected to a common communication bus. In a first embodiment, a plurality of resistor divider networks are used to select the desired circuit module coupled to the bus. More particularly, each circuit module of the plurality of circuit modules includes a microprocessor that cooperates with a corresponding resistor divider network to select the desired circuit module. The resistance values of the resistor elements of the resistor divider network are selected to provide a unique address for each corresponding microprocessor. In a second embodiment, a plurality of switches are used to select the desired circuit module from the plurality of circuit modules coupled to the common bus. Thus, each microprocessor cooperates with a corresponding switch configuration to select the desired circuit module coupled to the common bus. The switches are set to provide a unique address for the MCU/MPU's to which they correspond. An advantage of the present invention is that the addresses of the circuit modules are set at the circuit modules.

Figure 1:
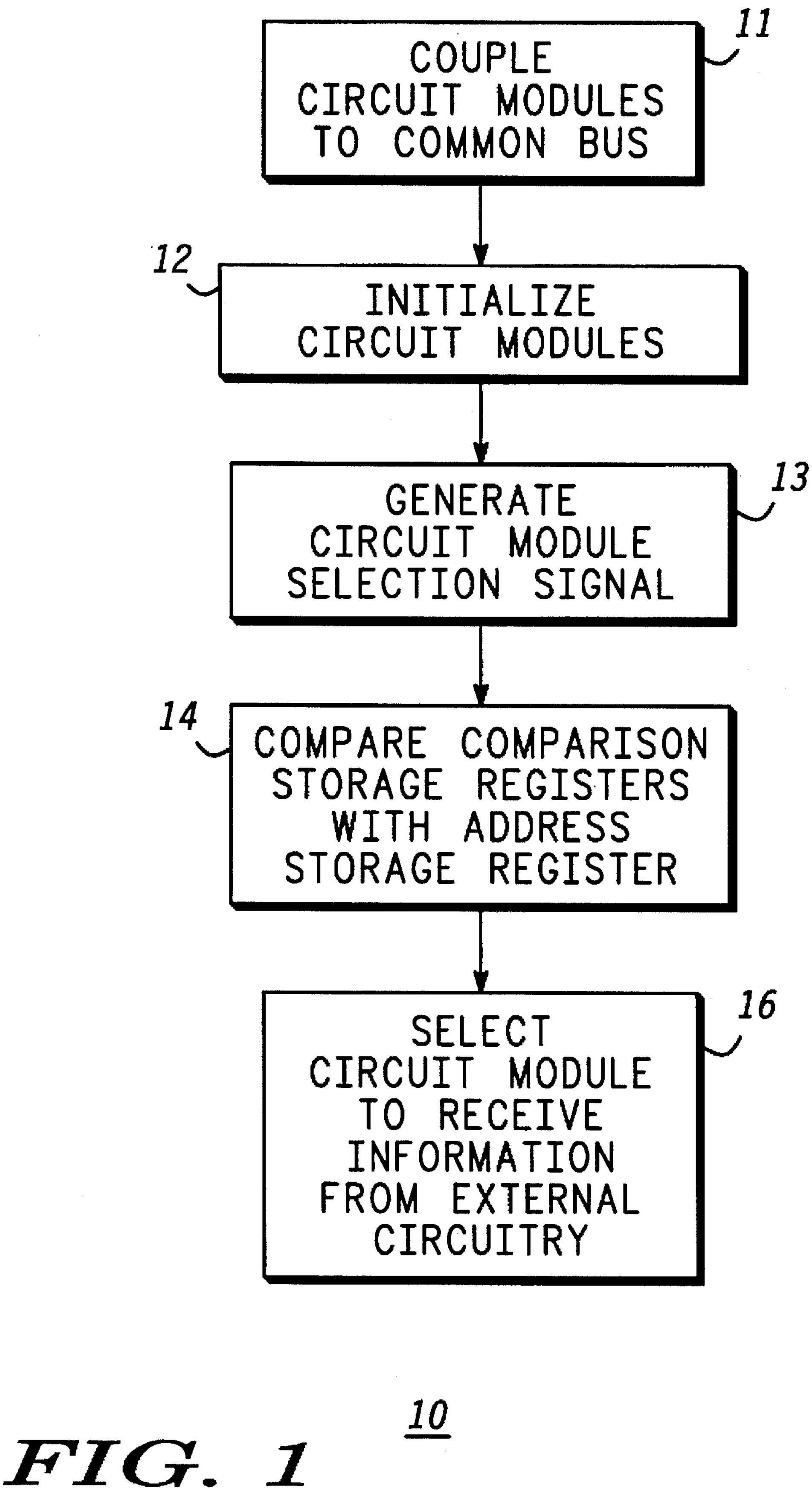
FIG. 1 illustrates a schematic block diagram of a technique for selecting a module from a plurality of modules in accordance with various embodiments of the present invention.

FIG. 1 illustrates a flow diagram 10 of a method for selecting at least one circuit module from a plurality of circuit modules coupled to a common bus. In a beginning step, the plurality of circuit modules are coupled to the bus or conductor as indicated by box 11 of flow diagram 10. By way of example, the circuit modules are microprocessor units (MPU's). However, it should be understood that the structures for the plurality of circuit modules are not limitations of the present invention. In other words, the circuit modules may contain MCU/MPU's, sensors, etc. It should be understood that the circuit modules can be an MCU/MPU's.

Each circuit module is initialized or reset to an initial state as indicated by box 12 of flow diagram 10. By way of example, each circuit module is initialized by storing an address unique to the particular circuit module in an address storage register or memory location associated with the particular circuit module. For example, a first circuit module may be given an address having a hexadecimal value of "0A." Thus, the hexadecimal value "0A" is stored in the address storage register or a memory location of the first circuit module. Likewise, an address having a hexadecimal value of "0B" is stored in the address storage register or a memory location of a second circuit module, an address having a hexadecimal value of "0C" is stored in the address storage register or a memory of a third circuit module, etc. It should be understood that the sizes of the address storage register and the particular address stored in the address storage register are not limitations of the present invention. In other words, the address storage register or memory location may be a four bit register, an eight bit register, a sixteen bit register, etc. It should be understood that the terms register and memory location are used interchangeably.

After initialization, a circuit module selection signal is generated as indicated by box 13 of flow diagram 10. More particularly, an electrical signal is placed on the common bus by external circuitry such as, for example, another MCU/MPU, a control circuit, etc. The electrical signal is stored as a digital electrical signal by each circuit module and stored in a comparison storage register within the circuit module. Each circuit module compares the digital electrical signal stored in its comparison storage register with the digital electrical signal stored in its address storage register as indicated by box 14 of flow diagram 10.

When the digital electrical signal stored in the address storage register matches the digital electrical signal stored in the comparison storage register, the circuit module having the match is selected to receive information transmitted from the control circuit as indicated by box 16 of flow diagram 10. In other words, if the match condition exists, then further communication in the form of data or commands is accepted by the circuit module having the match. On the other hand, the data or commands from the control circuit are ignored for a predetermined number of communication transfers or until a reset or similar command is placed on the communication bus by the control circuit when the match condition does not exist.

Figure 2:
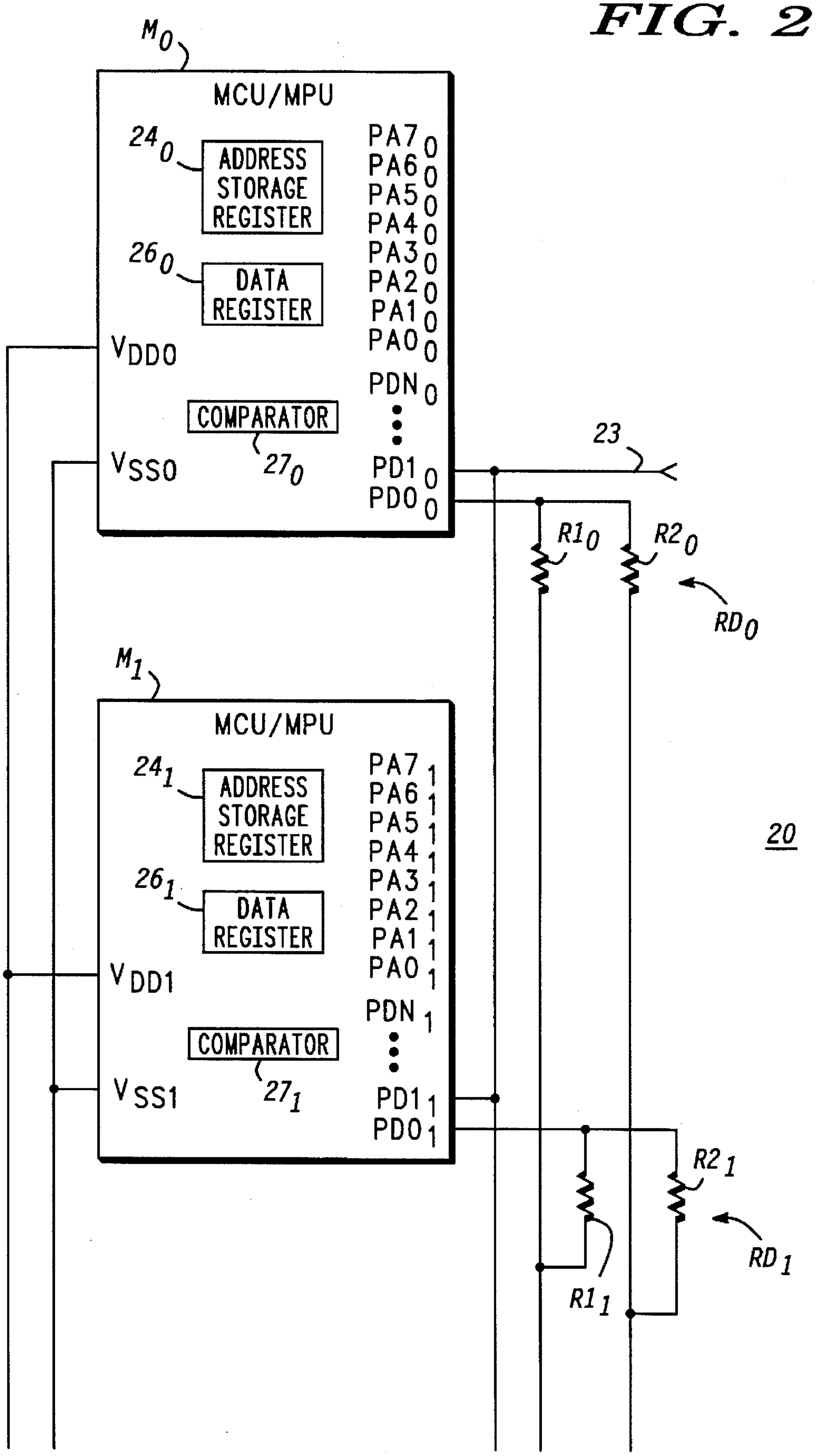
FIGS. 2–3 illustrates a schematic of a circuit for selecting a module from a plurality of modules in accordance with a first embodiment of the present invention.
Figure 3:
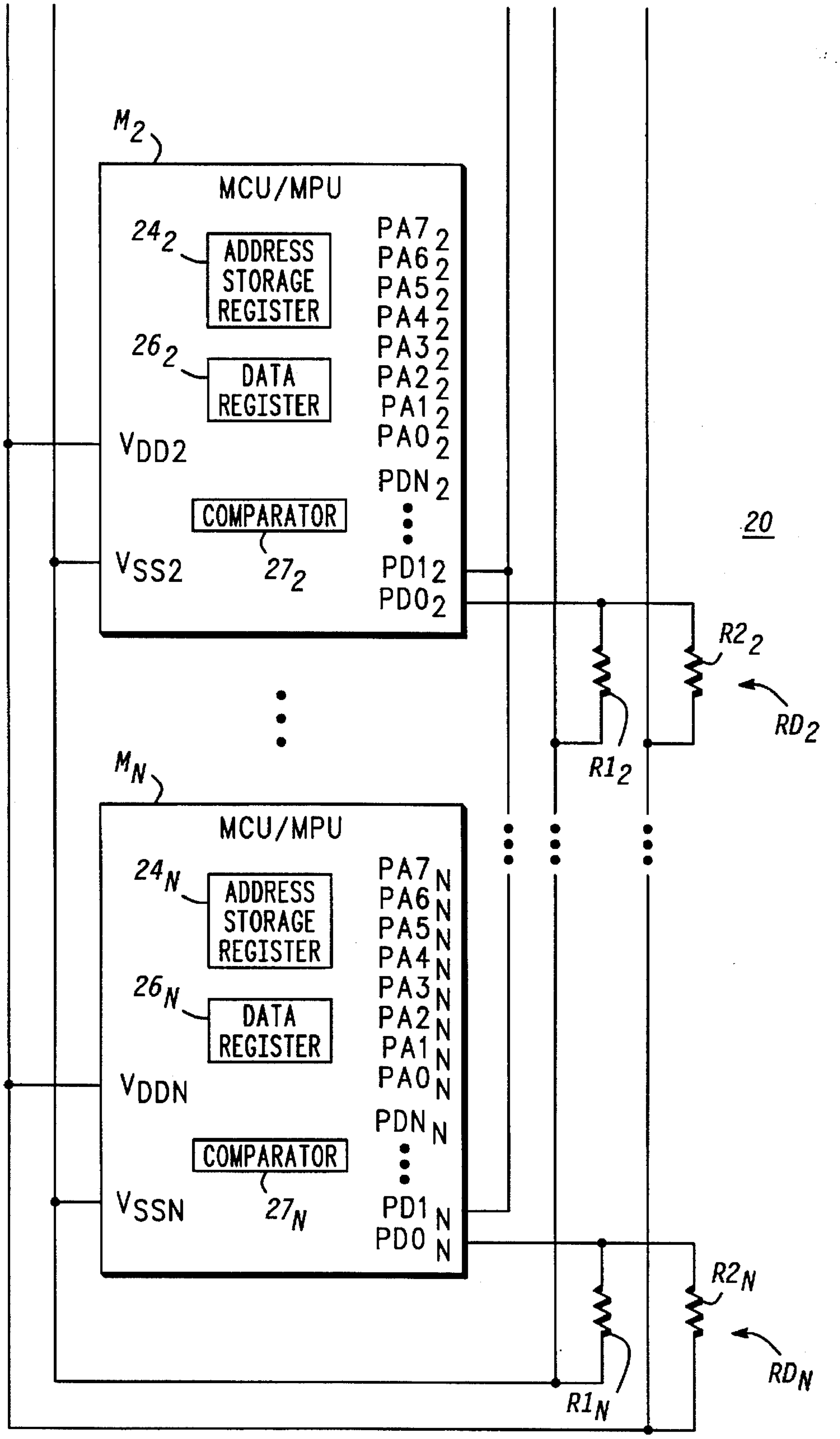

FIGS. 2–3 illustrate a schematic diagram 20 of a plurality of circuit modules $M_0$–$M_N$ and circuitry $S_0$–$S_N$ for selecting one circuit module from the plurality of circuit modules $M_0$–$M_N$. It should be understood that "N" circuit modules are illustrated, wherein the variable "N" represents an integer having a value of at least one. Accordingly, the number of circuit modules is not a limitation of the present invention. The circuit module identified by the reference number $M_N$ is also referred to as the $N^{th}$ circuit module. It should be further understood that FIG. 3 is a continuation of FIG. 2 and that due to size limitations, schematic diagram 20 has been separated into two portions.

By way of example, each circuit module $M_0$–$M_N$ is an MCU such as an MC68HC705B5 sold by Motorola, Inc. As those skilled in the art are aware, MCU's such as the MC68HC705B5 includes bidirectional input/output (I/O) ports, power supply ports ($V_{DD}$ and $V_{SS}$), reset and interrupt request ports (not shown), timer control input ports (not shown), and programming ports (not shown). It should be understood that ports not needed for an understanding of the present invention, e.g., reset and interrupt requests, have not been shown to simplify the description of the present invention. In addition, all the external circuitry for supporting the operation of the MCU/MPU is not shown. It should be noted the particular type of MCU/MPU is not a limitation of the present invention.

MCU/MPU's $M_0$–$M_N$ each have an 8-bit bidirectional I/O port, i.e., port A and an 8-bit input port, i.e., port D, capable of converting an analog electrical signal to a digital electrical signal. It should be noted that 8-bit I/O port A comprises eight single bit ports, PA7–PA0. In accordance with the first embodiment of the present invention, one of the 8-bit bidirectional ports of each MCU/MPU $M_0$–$M_N$ is coupled for setting an address in the respective MCU/MPU $M_0$–$M_N$. Thus, one of the resistor-divider networks $S_0$–$S_N$ is coupled to one of the individual ports of the corresponding MCU/MPU's $M_0$–$M_N$. Upon initialization, each of the resistor-divider networks $S_0$–$S_N$ provides an address unique to the circuit module to which they are coupled. Thus, resistor divider network $S_0$ comprises resistors $R1_0$ and $R2_0$ which provide an address unique to MCU/MPU $M_0$; resistor-divider network $S_1$ comprises resistors $R1_1$ and $R2_1$ which provide an address unique to MCU/MPU $M_1$; resistor-divider network $S_2$ comprises resistors $R1_2$ and $R2_2$ which provide an address unique to MCU/MPU $M_2$; and resistor-divider network $S_N$ comprises resistors $R1_N$ and $R2_N$ and provides an address unique to MCU/MPU $M_N$.

A first terminal of resistor $R1_0$ is connected to a first terminal of resistor $R2_0$ and to a port $PD0_0$ of circuit module $M_O$. It should be noted that port $PD0_0$ is capable of converting an analog electrical signal into a digital electric signal. A second terminal of resistor $R1_0$ is connected to power supply port $V_{SS0}$ and a second terminal of resistor $R2_0$ is connected to power supply port $V_{DD0}$. In other words, the resistor divider network is formed by connecting the first terminals of resistors $R1_0$ and $R2_0$ together, connecting the second terminal of resistor $R1_0$ to power supply port $V_{SS0}$, connecting the second terminal of resistor $R2_0$ to power supply port $V_{DD0}$, and connecting the node common to resistors $R1_0$ and $R2_0$ to input port $PD0_0$ of circuit module $M_0$.

A first terminal of resistor $R1_1$ is connected to a first terminal of resistor $R2_1$ and to a port $PD0_1$ of circuit module $M_1$. It should be noted that port $PD0_1$ is capable of converting an analog electrical signal into a digital electrical signal. A second terminal of resistor $R1_1$ is connected to power supply port $V_{SS1}$ and a second terminal of resistor $R2_1$ is connected to power supply port $V_{DD1}$. In other words, the resistor divider network is formed by connecting the first terminals of resistors $R1_1$ and $R2_1$ together, connecting the second terminal of resistor $R1_1$ to power supply port $V_{SS1}$, connecting the second terminal of resistor $R2_1$ to power supply port $V_{DD1}$, and connecting the node common to resistors $R1_1$ and $R2_1$ to input port $PD0_1$ of circuit module $M_1$.

A first terminal of resistor $R1_2$ is connected to a first terminal of resistor $R2_2$ and to a port $PD0_2$ of circuit module $M_2$. It should be noted that port $PD0_2$ is capable of converting an analog electrical signal into a digital electric signal. A second terminal of resistor $R1_2$ is connected to power supply port $V_{SS2}$ and a second terminal of resistor $R2_2$ is connected to power supply port $V_{DD2}$. In other words, the resistor divider network is formed by connecting the first terminals of resistors $R1_2$ and $R2_2$ together, connecting the second terminal of resistor $R1_2$ to power supply port $V_{SS2}$, connecting the second terminal of resistor $R2_2$ to power supply port $V_{DD1}$, and connecting the node common to resistors $R1_2$ and $R2_2$ to input port $PD0_2$ of circuit module $M_2$. It should be noted that circuit modules ($M_0$–$M_N$) can share a common power supply or be connected to individual power supplies.

A first terminal of resistor $R1_N$ is connected to a first terminal of resistor $R2_N$ and to a port $PD0_N$ of circuit module $M_N$. It should be noted that port $PD0_N$ is capable of converting an analog electrical signal into a digital electric signal. A second terminal of resistor $R1_N$ is connected to power supply port $V_{SSN}$ and a second terminal of resistor $R2_N$ is connected to power supply port $V_{DDN}$. In other words, the resistor divider network is formed by connecting the first terminals of resistors $R1_N$ and $R2_N$ together, the second terminal of resistor $R1_N$ to power supply port $V_{SS1}$, the second terminal of resistor $R2_N$ to power supply port $V_{DD1}$, and connecting the node common to resistors $R1_N$ and $R2_N$ to input port $PD0_N$ of circuit module $M_N$.

By way of example, resistors $R1_0$–$R1_N$ have a value of 10,000 ohms, resistor $R2_0$ has a value of 1.27 mega-ohms (MΩ), resistor $R2_1$ has a value of 402 kilo-ohms (kΩ), resistor $R2_2$ has a value of 240 kΩ, and resistor $R2_N$ has a value of 79Ω for a circuit having four circuit modules, i.e., N=4. It should be noted that the values of resistors $R1_0$–$R1_N$ and $R2_0$–$R2_N$ are selected to produce discrete analog voltages having voltage differences between circuit modules that are greater than the smallest bit resolution of the A/D converter including inherent channel noise.

In operation, circuit modules $M_0$–$M_N$ are initialized by converting the analog electrical signals appearing across resistor-divider networks $RD_0$–$RD_N$ into digital electrical signals unique to each circuit module. The digital electrical signals are stored in address storage registers $\mathbf{24}_0$–$\mathbf{24}_N$, present in the respective MCU/MPU's $M_0$–$M_N$. For example, the unique digital electrical signal generated by resistor-divider network $RD_0$ and MCU/MPU $M_0$ is stored in address storage register $\mathbf{24}_0$; the unique digital electrical signal generated by resistor-divider network $RD_1$ and MCU/MPU $M_1$ is stored in address storage register $\mathbf{24}_1$; the unique digital electrical signal generated by resistor-divider network $RD_2$ and MCU/MPU $M_2$ is stored in address storage register $\mathbf{24}_2$; and the unique digital electrical signal generated by resistor-divider network $RD_N$ and MCU/MPU $M_N$ is stored in address storage register $\mathbf{24}_N$. By way of example, address storage registers $\mathbf{24}_0$–$\mathbf{24}_N$ are 8-bit storage registers and the digital electrical signals stored in them are 8-bit digital electrical signals which serve as address signals.

An analog electrical signal is transmitted from the external circuitry (not shown) to each input port $PD1_0$–$PD1_N$ via common bus 23. The analog electrical signal contains an address segment followed by a data segment. It should be noted that the analog electrical signal is commonly referred to as a packet and contains a header and a body, wherein the header corresponds to the address segment and the body corresponds to the data segment. The analog electrical signal is converted into a digital electrical signal and stored in storage registers within MCU/MPU's $M_0$–$M_N$. More particularly, the address segment is converted into an 8-bit digital electrical signal and stored in comparator data registers 26$_0$–26$_N$. Each 8-bit digital electrical signal stored in address storage registers 24$_0$–24$_N$ is compared with the 8-bit digital electrical signals stored in the respective comparator data registers 26$_0$–26$_N$ by the respective comparator 27$_0$–27$_N$. In other words, the 8-bit digital electrical signal stored in address storage register 24$_0$ is compared with the 8-bit digital electrical signal stored in comparator storage register 26$_0$ by comparator 27$_0$, the 8-bit digital electrical signal stored in address storage register 24$_1$ is compared with the 8-bit digital electrical signal stored in comparator storage register 26$_1$ by comparator 27$_1$, etc.

When the 8-bit digital electrical signal stored in address storage registers 24$_0$–24$_N$ is equivalent to the 8-bit digital electrical signal stored in the respective comparator storage register 26$_0$–26$_N$, the MCU/MPU $M_0$–$M_N$ having the match accepts the data segment of the digital electrical signal. For example, if the digital electrical signal stored in address storage register 24$_0$ is "0A" (in hexadecimal notation) and the digital electrical signal stored in address storage register 24$_1$ is "0B" (in hexadecimal notation), and the 8-bit digital electrical signal stored in comparator storage register 26$_0$ is "0A" (in hexadecimal notation), then MCU/MPU $M_0$ is selected to receive or accept the electrical signal transmitted over common bus 30, whereas MCU/MPU's $M_1$–$M_N$ disregard this electrical signal. It should be understood that the implementation of the comparator function is not a limitation of the present invention. In other words, the comparison may be performed by the central processing units of each MCU/MPU $M_0$–$M_N$.

Figure 4:
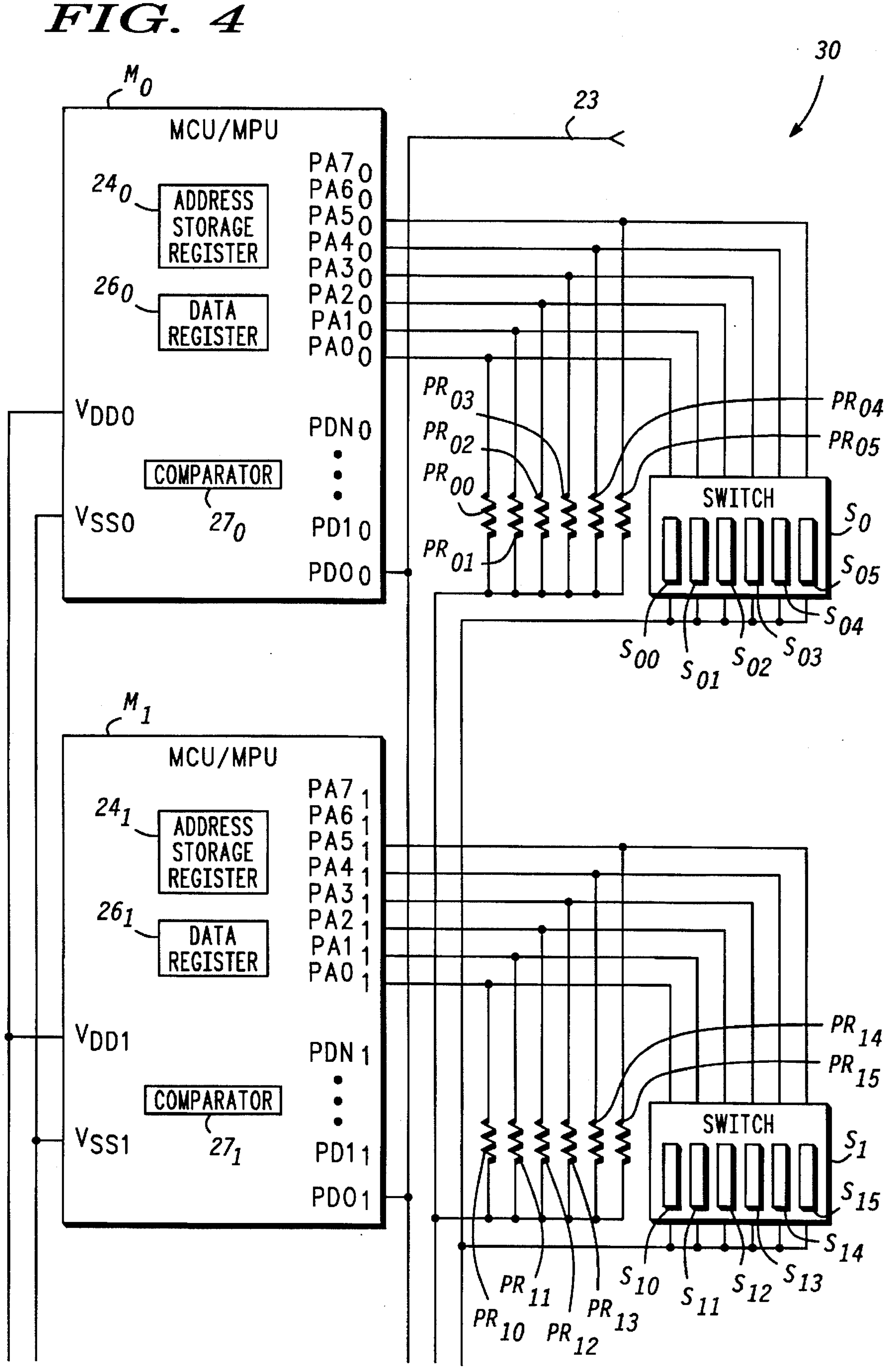
FIGS. 4–5 illustrates a schematic of a circuit for selecting a module from a plurality of modules in accordance with a second embodiment of the present invention.
Figure 5:
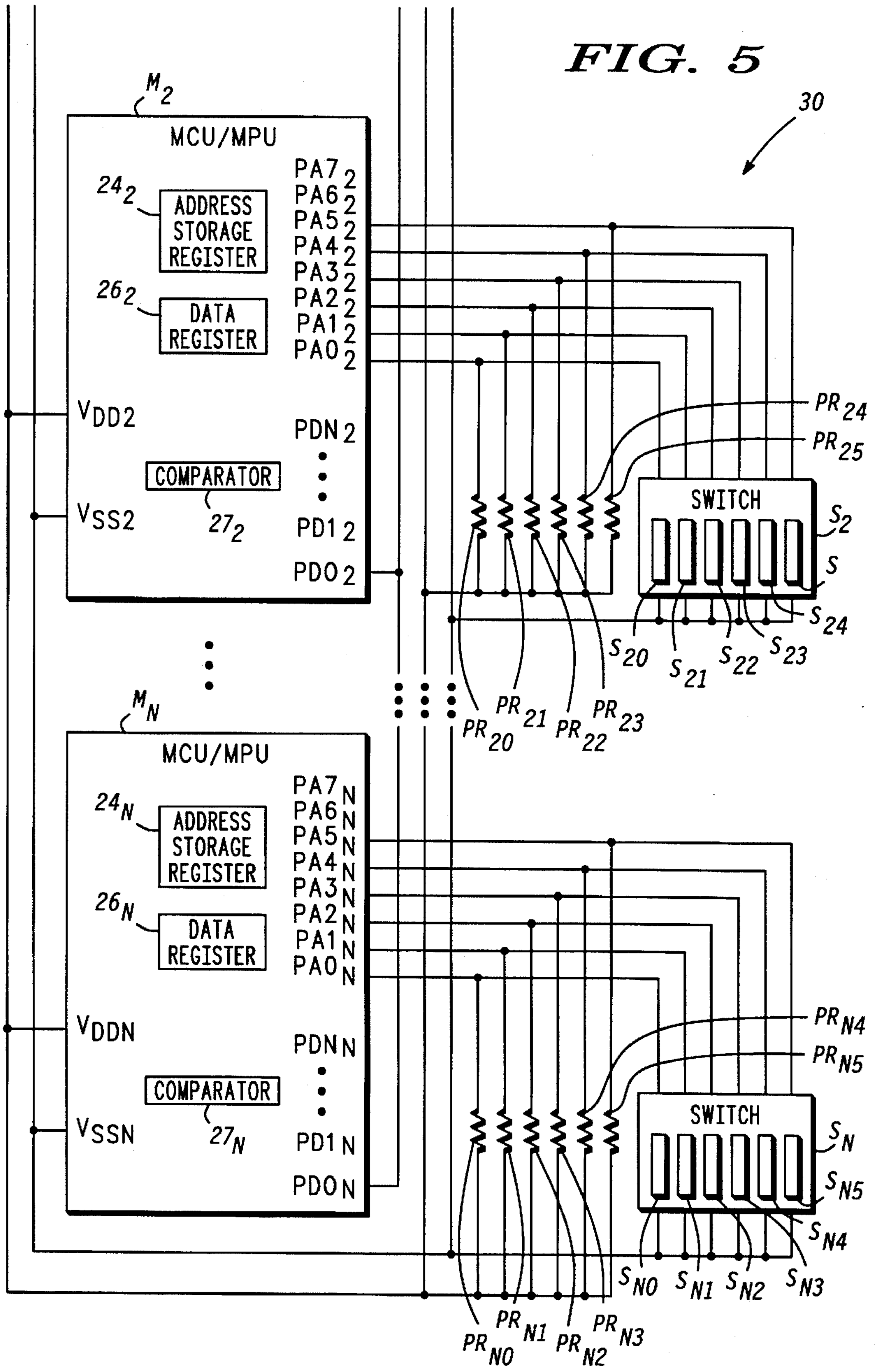

FIGS. 4–5 illustrate a schematic diagram 30 of a plurality of circuit modules $M_0$–$M_N$ and switches $S_0$–$S_N$ for selecting one circuit module from the plurality of circuit modules $M_0$–$M_N$. In accordance with the second embodiment of the present invention, the 8-bit bidirectional port A of each MCU/MPU $M_0$–$M_N$ is coupled for setting an address in the respective MCU/MPU $M_0$–$M_N$. More particularly, switches $S_0$–$S_N$ are coupled to port A of the corresponding MCU/MPU's $M_0$–$M_N$. Upon initialization, each of the switches $S_0$–$S_N$ provides an address unique to the circuit module $M_0$–$M_N$ to which they are coupled. Thus, switch $S_0$ provides an address unique to MCU/MPU $M_0$; switch $S_1$ provides an address unique to MCU/MPU $M_1$; switch $S_2$ provides an address unique to MCU/MPU $M_2$; and switch $S_N$ provides an address unique to MCU/MPU $M_N$. It should be understood that the same reference numerals are used in the figures to denote the same elements.

By way of example, switches $S_0$–$S_N$ have six switching elements each having first and second terminals, wherein switch $S_0$ has switching elements $S_{00}$–$S_{05}$, switch $S_1$ has switching elements $S_{10}$–$S_{15}$, switch $S_2$ has switching elements $S_{20}$–$S_{25}$, and switch $S_N$ has switching elements $S_{N0}$–$S_{N5}$. A first terminal of switching element $S_{00}$ is connected to port PA0$_0$ of circuit module $M_0$; a first terminal of switching element $S_{01}$ is connected to port PA1$_0$ of circuit module $M_0$; a first terminal of switching element $S_{02}$ is connected to port PA2$_0$ of circuit module $M_0$; a first terminal of switching element $S_{03}$ is connected to port PA3$_0$ of circuit module $M_0$; a first terminal of switching element $S_{04}$ is connected to port PA4$_0$ of circuit module $M_0$; and a first terminal of switching element $S_{05}$ is connected to port PA5$_0$ of circuit module $M_0$. The second terminals of switching elements $S_{00}$–$S_{05}$ are connected to power supply port $V_{SS0}$ of MCU/MPU $M_0$.

Further, the first terminals of switching elements $S_{00}$–$S_{05}$ are coupled to a power supply port $V_{DD0}$ via the respective pull-up resistors $PR_{00}$–$PR_{05}$. The use of pull-up resistors with switching elements is well known in the art. It should be understood that unused ports PA6$_0$ and PA7$_0$ may be left floating or coupled to a power supply or any common ground. It should be further understood that the use of an 8-bit I/O port, i.e., port A, and switches having six switching elements are not a limitation of the present invention. In other words, the I/O port may be a 4-bit I/O port, a 16-bit I/O port, a 32-bit I/O port, etc. Likewise, the number of switching elements may be more or less than six.

A first terminal of switching element $S_{10}$ is connected to port PA0$_1$ of circuit module $M_1$; a first terminal of switching element $S_{11}$ is connected to port PA1$_1$ of circuit module $M_1$; a first terminal of switching element $S_{12}$ is connected to port PA2$_1$ of circuit module $M_1$; a first terminal of switching element $S_{13}$ is connected to port PA3$_1$ of circuit module $M_1$; a first terminal of switching element $S_{14}$ is connected to port PA4$_1$ of circuit module $M_1$; and a first terminal of switching element $S_{15}$ is connected to port PA5$_1$ of circuit module $M_1$. The second terminals of switching elements $S_{10}$–$S_{15}$ are connected to power supply port $V_{SS1}$ of MCU/MPU $M_1$.

Further, the first terminals of switching elements $S_{10}$–$S_{15}$ are coupled to a power supply port $V_{DD0}$ via the respective pull-up resistors $PR_{10}$–$PR_{15}$. The use of pull-up resistors with switching elements is well known in the art. It should be understood that unused ports PA6$_1$ and PA7$_1$ may be left floating or coupled to a power supply or any common ground. It should be further understood that the use of an 8-bit I/O port, i.e., port A, and switches having six switching elements are not a limitation of the present invention. In other words, the I/O port may be a 4-bit I/O port, a 16-bit I/O port, a 32-bit I/O port, etc. Likewise, the number of switching elements may be more or less than six.

A first terminal of switching element $S_{20}$ is connected to port PA0$_2$ of circuit module $M_2$; a first terminal of switching element $S_{21}$ is connected to port PA1$_2$ of circuit module $M_2$; a first terminal of switching element $S_{22}$ is connected to port PA2$_2$ of circuit module $M_2$; a first terminal of switching element $S_{23}$ is connected to port PA3$_2$ of circuit module $M_2$; a first terminal of switching element $S_{24}$ is connected to port PA4$_2$ of circuit module $M_2$; and a first terminal of switching element $S_{25}$ is connected to port PA5$_2$ of circuit module $M_2$. The second terminals of switching elements $S_{20}$–$S_{25}$ are connected to power supply port $V_{SS2}$ of MCU/MPU $M_2$.

Further, the first terminals of switching elements $S_{20}$–$S_{25}$ are coupled to a power supply port $V_{DD2}$ via the respective pull-up resistors $PR_{20}$–$PR_{25}$. The use of pull-up resistors with switching elements is well known in the art. It should be understood that unused ports PA6$_2$ and PA7$_2$ may be left floating or coupled to a power supply or any common ground. It should be further understood that the use of an 8-bit I/O port, i.e., port A, and switches having six switching elements are not a limitation of the present invention. In other words, the I/O port may be a 4-bit I/O port, a 16-bit I/O port, a 32-bit I/O port, etc. Likewise, the number of switching elements may be more or less than six.

A first terminal of switching element $S_{N0}$ is connected to port PA0$_N$ of circuit module $M_N$; a first terminal of switching element $S_{N1}$ is connected to port $PA1_N$ of circuit module $M_N$; a first terminal of switching element $S_{N2}$ is connected to port $PA2_N$ of circuit module $M_N$; a first terminal of switching element $S_{N3}$ is connected to port $PA3_N$ of circuit module $M_N$; a first terminal of switching element $S_{N4}$ is connected to port $PA4_N$ of circuit module $M_N$; and a first terminal of switching element $S_{N5}$ is connected to port $PA5_N$ of circuit module $M_N$. The second terminals of switching elements $S_{N0}$–$S_{N5}$ are connected to power supply port $V_{SSN}$ of MCU/MPU $M_N$.

Further, the first terminals of switching elements $S_{N0}$–$S_{N5}$ are coupled to a power supply port $V_{DDN}$ via the respective pull-up resistors $PR_{N0}$–$PR_{N5}$. The use of pull-up resistors with switching elements is well known in the art. It should be understood that unused ports $PA6_N$ and $PA7_N$ may be left floating or coupled to a power supply or any common ground. It should be further understood that the use of an 8-bit I/O port, i.e., port A, and switches having six switching elements are not a limitation of the present invention. In other words, the I/O port may be a 4-bit I/O port, a 16-bit I/O port, a 32-bit I/O port, etc. Likewise, the number of switching elements may be more or less than six.

By way of example, resistors $PR_{00}$–$PR_{05}$, $PR_{10}$–$PR_{15}$, $PR_{20}$–$PR_{25}$, and $PR_{N0}$–$PR_{N5}$ have a resistance value of 10,000 ohms. It should be understood that the resistance values of resistors $PR_{00}$–$PR_{05}$, $PR_{10}$–$PR_{15}$, $PR_{20}$–$PR_{25}$, and $PR_{N0}$–$PR_{N5}$ are not a limitation of the present invention.

Further, each input port $PD1_0$–$PD1_N$ is coupled to a common bus 23 through which an analog electrical signal containing, for example, a circuit module select signal, a clock signal, and a data signal is transmitted. It should be understood that common bus 23 is coupled to external circuitry (not shown) which provides the circuit module select, clock, and data signals.

In operation, circuit modules $M_0$–$M_N$ are initialized by selecting the positions of switching elements $S_{00}$–$S_{05}$, $S_{10}$–$S_{15}$, $S_{20}$–$S_{25}$, and $S_{N0}$–$S_{N5}$ to produce an analog voltage signal at the first terminals of the respective switches $S_0$–$S_N$ that are unique to each circuit module $M_0$–$M_N$. The analog electrical signals appearing at the first terminals of switches $S_0$–$S_N$ are converted into digital electrical signals by MCU/MPU's $M_0$–$M_N$, wherein the digital electrical signals are unique to the respective circuit modules $M_0$–$M_N$. The digital electrical signals are stored in address storage registers $24_0$–$24_N$, present in the respective MCU/MPU's $M_0$–$M_N$. For example, the unique digital electrical signal generated by switch $S_0$ and MCU/MPU $M_0$ is stored in address storage register $24_0$; the unique digital electrical signal generated by switch $S_1$ and MCU/MPU $M_1$ is stored in address storage register $24_1$; the unique digital electrical signal generated by switch $S_2$ and MCU/MPU $M_2$ is stored in address storage register $24_2$; and the unique digital electrical signal generated by switch $S_N$ and MCU/MPU $M_N$ is stored in address storage register $24_N$. By way of example, address storage registers $24_0$–$24_N$ are 8-bit storage registers and the digital electrical signals stored in them are 8-bit digital electrical signals which serve as address signals.

An electrical signal is transmitted from the external circuitry (not shown) to each input port $PD1_0$–$PD1_N$ via common bus 23. The electrical signal contains an address segment followed by a data segment. It should be noted that the electrical signal is commonly divided into a number of bits such as a byte. Each byte contains a header and a body, wherein the header corresponds to the address segment and the body corresponds to the data segment. The electrical signal is converted into a digital electrical signal and stored in storage registers within MCU/MPU's $M_0$–$M_N$. More particularly, the address segment is converted into an 8-bit digital electrical signal and stored in comparator data registers $26_0$–$26_N$. Each 8-bit digital electrical signal stored in address storage registers $24_0$–$24_N$ is compared with the 8-bit digital electrical signals stored in the respective comparator data registers $26_0$–$26_N$ by the respective comparator $27_0$–$27_N$. In other words, the 8-bit digital electrical signal stored in address storage register $24_0$ is compared with the 8-bit digital electrical signal stored in comparator storage register $26_0$ by comparator $27_0$, the 8-bit digital electrical signal stored in address storage register $24_1$ is compared with the 8-bit digital electrical signal stored in comparator storage register $26_1$ by comparator $27_1$, etc.

When the 8-bit digital electrical signal stored in address storage registers $24_0$–$24_N$ is equivalent to the 8-bit digital electrical signal stored in the respective comparator storage register $26_0$–$26_N$, the MCU/MPU $M_0$–$M_N$ having the match accepts the data segment of the digital electrical signal. For example, if the digital electrical signal stored in address storage register $24_0$ is "0A" (in hexadecimal notation) and the digital electrical signal stored in address storage register $24_1$ is "0B" (in hexadecimal notation), and the 8-bit digital electrical signal stored in comparator storage register $26_0$ is "0A" (in hexadecimal notation), then MCU/MPU $M_0$ is selected to receive or accept the electrical signal transmitted over common bus 30, whereas MCU/MPU's $M_1$–$M_N$ disregard this electrical signal. It should be understood that the implementation of the comparator function is not a limitation of the present invention. In other words, the comparison may be performed by the central processing units of each MCU/MPU $M_0$–$M_N$.

By now it should be appreciated that circuitry and a method for selecting a circuit module from a plurality of circuit modules that are coupled to a common bus have been provided. An advantage of the present method is that a single common bus can be used to provide an electrical signal for selecting a particular circuit module as well as data and control signals. Since a single common bus is used, the number of conductors or wires coupling control circuitry to the circuit modules is reduced, thereby reducing the overall system cost.

I claim:

1. A method for selecting at least one circuit module from a plurality of circuit modules, comprising the steps of:

- coupling the plurality of circuit modules to at least one conductor;
- initializing at least two of the plurality of circuit modules, wherein an address unique to each circuit module is stored in an address storage location of a corresponding circuit module of the at least two circuit modules, the address being an encoded voltage level;
- converting an analog voltage level on the at least one conductor into an N-bit digital electrical signal;
- storing the N-bit digital electrical signal in a data register of each circuit module of the at least two circuit modules;
- comparing the N-bit digital electrical signal with the address unique to each circuit module;
- generating a circuit module selection signal in accordance with a result of comparing the electrical signal present in the at least one conductor with the address unique to each circuit module; and
- selecting the circuit module in response to the circuit module selection signal.

2. The method of claim 1, wherein the step of initializing at least two of the plurality of circuit modules includes generating the address unique to each circuit module in response to switch settings.

3. The method of claim 1, wherein the step of initializing at least two of the plurality of circuit modules includes generating the address unique to each circuit module in response to resistor networks coupled to respective circuit modules.

4. The method of claim 3, wherein the step of initializing at least two of the plurality of circuit modules includes forming each resistor network by coupling a first terminal of a first resistor with a first terminal of a second resistor, coupling a second terminal of the first resistor to a first power supply conductor, and coupling the second terminal of the second resistor to a second power supply conductor.

5. The method of claim 1, wherein the step of initializing at least two of the plurality of circuit modules includes converting an analog electrical signal into an N-bit digital electrical signal, wherein the N-bit digital electrical signal serves as the module identification code.

6. The method of claim 1, wherein the step of selecting the circuit module in response to the circuit module select signal includes transmitting at least one electrical signal between the selected circuit module and a circuit coupled to the circuit module.

7. A method for arbitrating between circuit modules coupled to a common bus, comprising the steps of:

storing an address for each circuit module in an address storage register associated with each circuit module, wherein a unique address is stored in each data register;

converting an analog electrical signal representing the address select signal into a digital electrical signal representing the address select signal storing the address select signal in a comparison data register;

comparing the address select signal with the address for each circuit module; and accessing the circuit module having the address that matches the address select signal.

8. The method of claim 7, wherein the step of storing the address select signal in a comparison data register includes storing the address select signal in a comparison data register associated with each circuit module.

9. The method of claim 7, wherein the step of storing an address for each circuit module in an address data register associated with each circuit module includes converting an analog electrical signal representing the address into a digital electrical signal representing the address.

10. The method of claim 7, wherein the step of accessing the circuit module having the address that matches the address select signal includes transmitting electrical signals between the circuit module and a circuit coupled to the circuit module.

11. A circuit module selection circuit, comprising:

a plurality of circuit modules, wherein each circuit module is coupled to a common conductor;

an analog-to-digital converter coupled for receiving a signal from the common conductor;

a plurality of address storage structures, wherein each of the plurality of address storage structures serves to store an address of a corresponding circuit module of the plurality of circuit modules, the address received from the analog-to-digital converter;

an initialization circuit which provides addresses for corresponding address storage registers of the plurality of address storage registers; and an address select register coupled to receive an address select signal.

12. The circuit module selection circuit of claim 11, wherein the initialization circuit comprises a plurality of switches that provide the addresses of the circuit modules of the plurality of circuit modules and wherein each switch provides the address of a single circuit module.

13. The circuit module selection circuit of claim 11, wherein the initialization circuit comprises a plurality of resistor networks that provide the addresses of the circuit modules of the plurality of circuit modules and wherein each resistor network provides the address of a single circuit module.

14. The circuit module selection circuit of claim 11, wherein each circuit module of the plurality of circuit modules includes the plurality of address storage structures.

15. The circuit module selection circuit of claim 11, wherein at least two circuit modules of said plurality of circuit modules each comprises a microprocessor.

* * * * *

UNITED STATES PATENT AND TRADEMARK OFFICE

CERTIFICATE OF CORRECTION

PATENT NO. : 5,646,609

DATED : July 8, 1997

INVENTOR(S) : Gary O'Brien

It is certified that error appears in the above-indentified patent and that said Letters Patent is hereby corrected as shown below:

In column 9, claim 7, line 32, after "signal", insert --;--.

Signed and Sealed this

Twenty-fourth Day of March, 1998

Attest:

BRUCE LEHMAN

*Attesting Officer*

*Commissioner of Patents and Trademarks*